United States Patent [19]
Kadowaki et al.

[11] Patent Number: 5,272,512
[45] Date of Patent: Dec. 21, 1993

[54] DISPLACEMENT INFORMATION DETECTION APPARATUS

[75] Inventors: Hidejiro Kadowaki; Hiroshi Sugiyama, both of Yokohama; Yasuhiko Ishida, Tokyo; Makoto Takamiya, Kawasaki, all of Japan

[73] Assignee: Canon Kabushiki Kaisha, Tokyo, Japan

[21] Appl. No.: 996,852

[22] Filed: Dec. 21, 1992

Related U.S. Application Data

[63] Continuation of Ser. No. 760,194, Sep. 16, 1991, abandoned.

[30] Foreign Application Priority Data

Sep. 21, 1990 [JP] Japan .................. 2-252290
Sep. 6, 1991 [JP] Japan .................. 3-255784

[51] Int. Cl.⁵ ................................ G01P 3/36
[52] U.S. Cl. ........................ 356/28; 356/28.5; 356/4; 356/4.5
[58] Field of Search .............. 356/28, 28.5, 4, 4.5, 356/358

[56] References Cited

U.S. PATENT DOCUMENTS

| | | | |
|---|---|---|---|
| 3,744,410 | 7/1973 | van Deelen | 356/28 |
| 3,756,723 | 9/1973 | Hock | 356/110 |
| 3,830,568 | 8/1974 | Allen | 356/28 |
| 4,948,257 | 8/1990 | Kaufman et al. | 356/354 |
| 4,974,960 | 12/1990 | Dopheide et al. | 356/28.5 |
| 4,991,963 | 2/1991 | Sutton | 356/353 |

FOREIGN PATENT DOCUMENTS 3008252 9/1981 Fed. Rep. of Germany .
2380554 9/1978 France .

OTHER PUBLICATIONS

R. Battig, W. Hodel, R. Stierlin, & H. Weber, Probing a fluid through a distorting interface using a monostatic fiber-optic Doppler velocimeter, Applied Optics, No. 23, 1 Dec. 1988, pp. 4844-4849.

1987 Mitsubishi Semiconductor Data Book, Optical Semiconductor Element Edition (and partial translation of description of FIG. 6).

C. P. Wang, "Doppler Velocimeter Using Diffraction Grating and White Light", Applied Optics, vol. 13, No. 5, pp. 1193-1195 (May 1974).

W. Farmer, "Two-dimensional Bragg Cell LDV System Using Multiple Light Frequencies", Applied Optics, vol. 17, No. 2, pp. 166-168 (Jan. 1978).

Taylor & Francis Ltd., "Optical Acta", International Journal of Optics, vol. 9, No. 1, pp. 1-12 (Jan. 1962).

Primary Examiner—Mark Hellner
Attorney, Agent, or Firm—Fitzpatrick, Cella, Harper & Scinto

[57] ABSTRACT

An apparatus for detecting velocity of an object, includes a light source for generating light having a wavelength $\lambda$, a light-transmission block for receiving the light from the light source, and guiding the light onto the object, and a photosensor for detecting the light from the object on which the light from the light-transmission block is incident. The light-transmission block is integrally constituted by a diffraction grating for diffracting the light from the light source to produce two diffraction lights, and an optical element for causing the two diffraction lights from the diffraction grating to be incident onto the object at a predetermined incident angle. The diffraction grating and the optical element are arranged so as to have substantially constant $\sin\theta/\lambda$ independently of a change in wavelength $\lambda$ of the light from the light source where $\theta$ is the incident angle of each diffraction light onto the object. A velocity of the object is detected through detection by the photosensor.

47 Claims, 6 Drawing Sheets

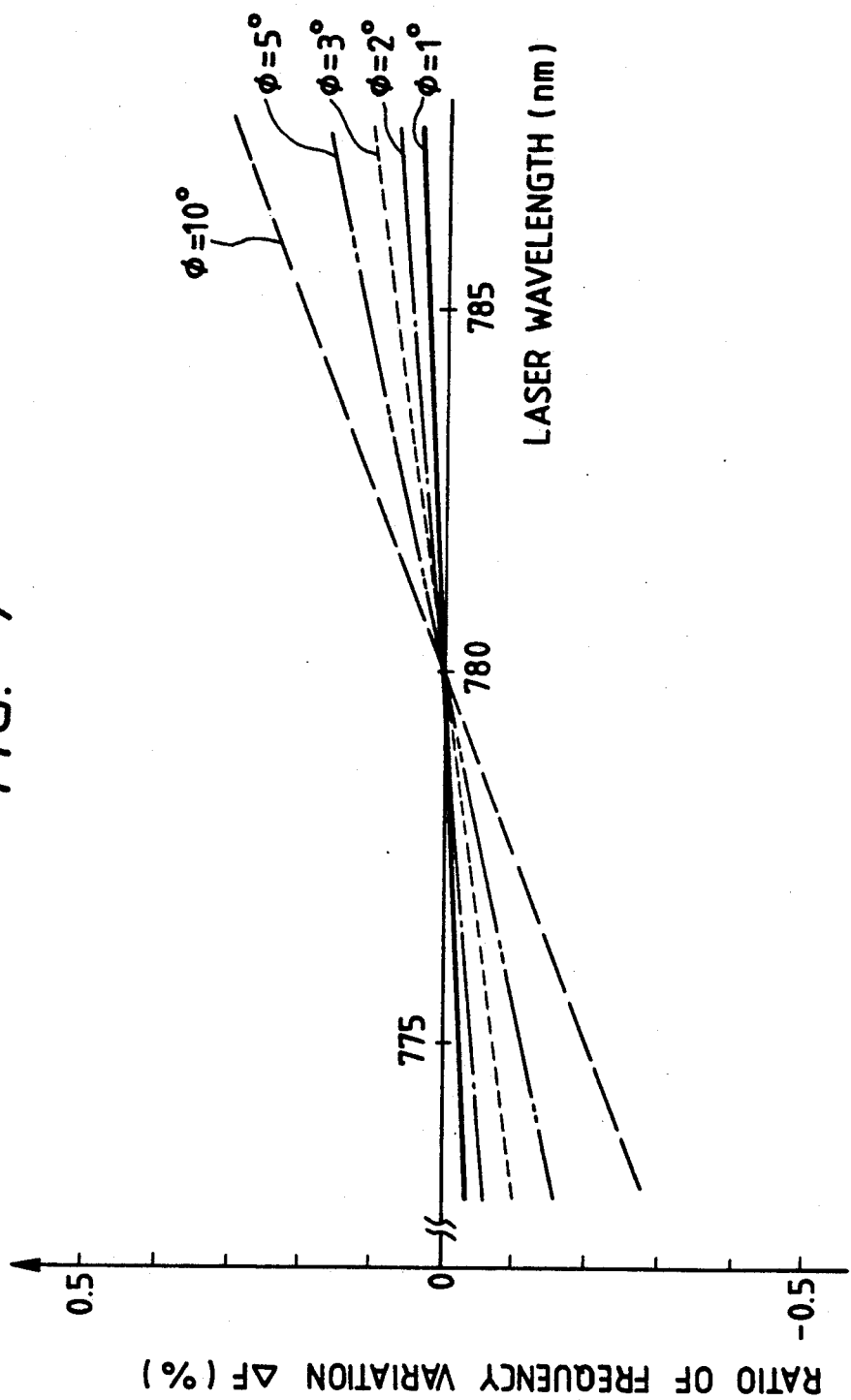

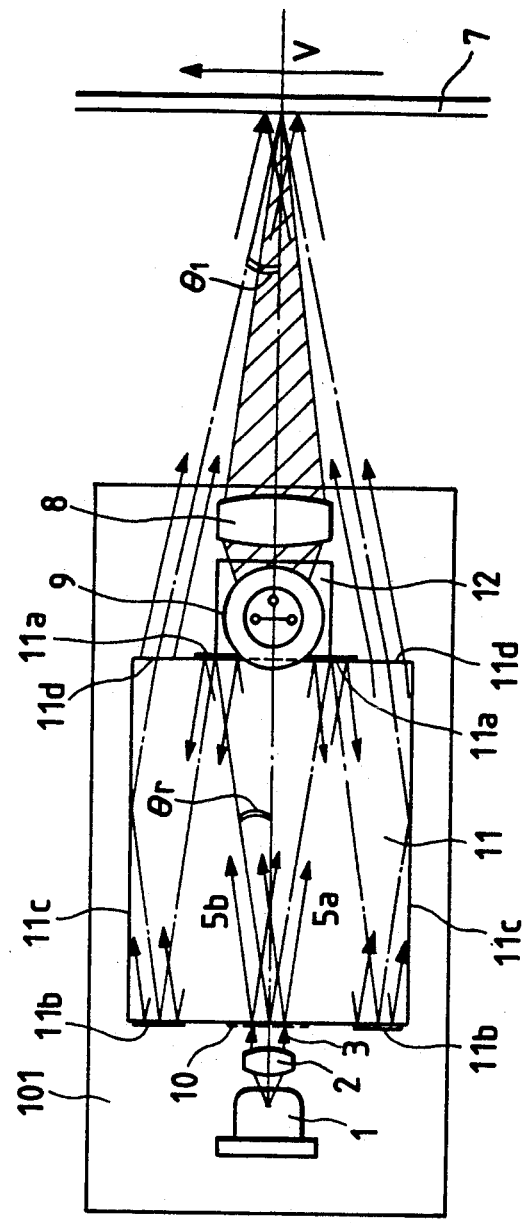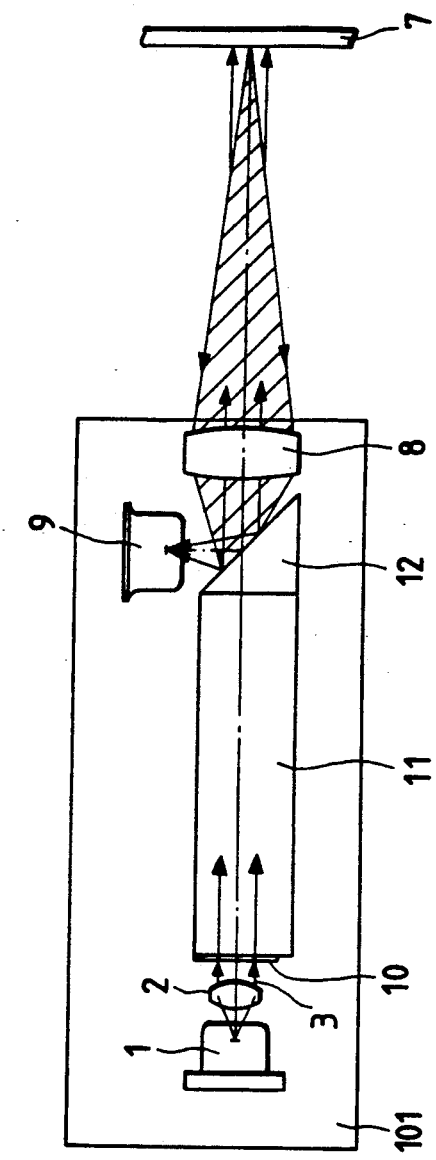
FIG. 8A
FIG. 8B

DISPLACEMENT INFORMATION DETECTION APPARATUS

This application is a continuation of application Ser. No. 07/760,194, filed Sep. 16, 1991, now abandoned.

BACKGROUND OF THE INVENTION

1. Field of the Invention

The present invention relates to a displacement information detection apparatus. For example, the present invention is suitable for a Doppler velocimeter which radiates a laser beam onto a moving object or fluid (to be referred to as a "moving object" hereinafter), and detects a shift in frequency of scattered light which is Doppler-shifted according to a moving velocity of the moving object, thereby measuring the moving velocity of the moving object in a noncontact manner.

2. Related Background Art

As a conventional apparatus for measuring a moving velocity of a moving object with high precision in a noncontact manner, a laser Doppler velocimeter is used. The laser Doppler velocimeter is an apparatus for radiating a laser beam onto a moving object, and measuring the moving velocity of the moving object by utilizing an effect (Doppler effect) in that the frequency of scattered light from the moving object is shifted in proportion to the moving velocity of the moving object.

FIG. 1 is a diagram for explaining a conventional laser Doppler velocimeter.

In FIG. 1, a laser beam emitted from a laser 1 is converted into a collimated beam 3 by a collimator lens 2, and the collimated beam is split into a transmission beam 5$a$ and a reflection beam 5$b$ by a beam splitter 4. These beams 5$a$ and 5$b$ are respectively reflected by reflection mirrors 6$a$ and 6$b$, and the reflected beams are then radiated from different directions at an incident angle $\theta$ on a moving object 7, which is moving at a speed V. Scattered lights from the moving object 7 are detected by a photosensor 9 via a focusing lens 8. In this case, the frequencies of scattered lights based on the two beams are Doppler-shifted by $+\Delta f$ and $-\Delta f$ in proportion to the moving speed V. If the wavelength of the laser beam is represented by $\lambda$, a frequency change $\Delta f$ can be expressed by the following equation (1):

$$\Delta f = V \cdot \sin(\theta)/\lambda \qquad (1)$$

The scattered lights Doppler-shifted by $+\Delta f$ and $-\Delta f$ interfere with each other, and cause a change in brightness pattern on the light-receiving surface of the photosensor 9. The frequency F of the scattered light is given by the following equation (2):

$$F = 2 \cdot \Delta f = 2 \cdot V \cdot \sin(\theta)/\lambda \qquad (2)$$

When the frequency F of the photosensor 9 (to be referred to as a "Doppler frequency" hereinafter) is measured from equation (2), the moving velocity of the moving object 7 can be obtained.

In the conventional laser Doppler velocimeter, the Doppler frequency F is inversely proportional to the wavelength $\lambda$ of the laser, as can be seen from equation (2). Therefore, the laser Doppler velocimeter must employ a laser light source having a stable wavelength. As a laser light source capable of performing continuous oscillation, and having a stable wavelength, a gas laser such as an He-Ne laser is often used. However, a laser oscillator itself is bulky, and requires a high voltage in a power supply. As a result, the apparatus tends to become bulky and expensive.

A laser diode (or a semiconductor laser) used in a compact disk device, a video disk device, an optical fiber communication, and the like is very small, and is easily driven. However, the laser diode has temperature dependency.

FIG. 2 is a graph for explaining a standard temperature dependency of a laser diode (quoted from '87 Mitsubishi Semiconductor Data Book; Optical Semiconductor Element Edition). A portion where the wavelength is continuously changed is mainly caused by a change in refractive index of an active layer of the laser diode according to a change in temperature, and changes at a rate of 0.05 to 0.06 nm/°C. On the other hand, a portion where the wavelength is discontinuously changed is called longitudinal mode hopping, and changes at a rate of 0.2 to 0.3 nm/°C.

In order stabilize the wavelength, a method of controlling the laser diode to have a predetermined temperature is normally employed. In this method, temperature control members, such as a heater, a radiator, a temperature sensor, and the like must be attached to the laser diode with a low heat resistance, and precise temperature control must be performed. As a result, the laser Doppler velocimeter becomes relatively large in size, and its cost is increased. In addition, instability in wavelength caused by the longitudinal mode hopping cannot be perfectly eliminated.

As a laser Doppler velocimeter which can solve the above-mentioned problems, the following system (to be referred to as a G-LDV hereinafter) has been proposed. In this system, a laser beam is incident on a diffraction grating, and of diffraction lights obtained from the diffraction grating, two, i.e., +nth-order and -nth-order (n=1, 2, ...) diffraction lights other than the 0th-order diffraction light are radiated on a moving object at the same crossing angle as an angle defined by the above-mentioned two beams. Scattered lights from the moving object are detected by a photosensor.

FIG. 3 shows diffraction lights obtained when a laser beam I is incident on a transmission type diffraction grating 10 having a grating pitch d, in a direction perpendicular to an arranging direction t of the gratings. In this case, a diffraction angle $\theta_0$ is given by:

$$\sin\theta_0 = m\lambda/d$$

where m is the diffraction order (0, 1, 2, ...), and $\lambda$ is the wavelength of the laser beam.

Of these lights, $\pm$nth-order lights other than the 0th-order lights are expressed by the following equation:

$$\sin\theta_0 = \pm n\lambda/d \qquad (3)$$

FIG. 4 is a diagram for explaining a Doppler velocimeter, proposed by U.S. Ser. No. 501,499, for radiating the $\pm$nth-order lights on the moving object 7 from different directions to have an incident angle $\theta_0$. From equations (2) and (3), the Doppler frequency F of the photosensor 9 is given by:

$$F = 2V\sin\theta_0/\lambda = 2nV/d \qquad (4)$$

More specifically, the frequency F is inversely proportional to the grating pitch d of the diffraction grating 10 independently of the laser beam I, and is proportional to the moving velocity of the moving object 7. Since the grating pitch d can be sufficiently stable, the Doppler frequency F is proportional to only the moving velocity of the moving object 7. Note that the same applies to a case wherein the diffraction grating 10 comprises a reflection type diffraction grating.

SUMMARY OF THE INVENTION

The present invention is an applied invention of the prior art, and has as its first object to provide a displacement information detection apparatus in which the positional relationship between a diffraction grating which is set so as to accurately obtain a Doppler signal corresponding to a velocity independently of the wavelength, and other optical elements is not easily changed due to aging, an environmental variation, and the like.

Other objects of the present invention will be apparent from the following detailed description of the embodiment of the present invention.

BRIEF DESCRIPTION OF THE DRAWINGS

FIG. 7 is a chart for explaining a Doppler frequency when the reflection mirror 6a shown in FIG. 6 is inclined;

FIGS. 8A and 8B are respectively a plan view and a side view of the second embodiment of the present invention.

DETAILED DESCRIPTION OF THE PREFERRED EMBODIMENTS

Figure 5:
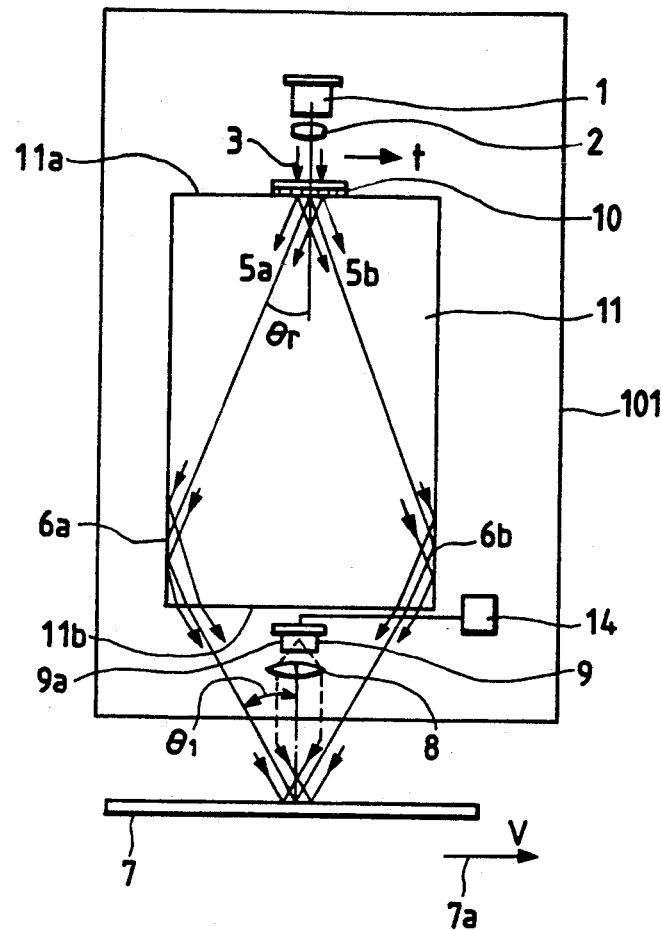
FIG. 5 is a schematic diagram of a principal part of the first embodiment of the present invention.

FIG. 5 is a schematic diagram of an optical system according to the first embodiment of the present invention. In FIG. 5, a Doppler velocimeter 101 includes a light source 1 comprising, e.g., a laser diode, a semiconductor laser, or the like (to be referred to as a "laser" hereinafter), a collimator lens 2 for converting a light beam from the laser 1 into a collimated beam 3, and a diffraction grating 10 which comprises a transmission type diffraction grating having a grating pitch $d = 1.6$ $\mu$m, and is set to diffract $\pm$1st-order diffraction lights at a diffraction angle $\theta_1$ ($\theta_1 = 29°$ in air).

A beam transmission means 11 comprises a prism-like glass block (a refractive index = 1.5). Side surfaces 6a and 6b of the beam transmission means 11 serve as total reflection or mirror-surface reflection surfaces (surfaces formed with reflection films).

The diffraction grating 10 is fixed on a portion of an upper surface (incident surface) 11a of the beam transmission means 11. The reflection surfaces 6a and 6b are perpendicular to a grating arranging direction t of the diffraction grating 10, and are parallel to each other. More specifically, the two reflection surfaces 6a and 6b face each other and are parallel to each other.

A moving object or moving fluid (to be referred to as a "moving object" hereinafter) 7 is moving in a direction of an arrow 7a at a moving velocity V. A focusing lens 8 focuses Doppler-shifted scattered lights from the moving object 7 onto a detection surface 9a of a photosensor 9 as a detection means. The surface of the moving object 7 is substantially conjugate with the detection surface 9a. An arithmetic means 14 calculates the moving velocity V using a Doppler signal obtained by the photosensor 9.

In this embodiment, a laser beam having a wavelength $\lambda$ of about 0.78 $\mu$m emitted from the laser 1 is converted into the collimated beam 3 having a spot size of about 2 mm, and the collimated beam is incident on the transmission type diffraction grating 10 in a direction perpendicular to the grating arranging direction t. $\pm$nth-order (n = 1 in this embodiment) diffraction lights 5a and 5b to be diffracted by the diffraction grating 10 at the diffraction angle $\theta_1$ ($\theta_1 = 29°$) in air are incident from the incident surface 11a of the beam transmission means 11. A diffraction angle $\theta_r$ of the diffraction lights with in the beam transmission means 11 is given by:

$$1.5\sin\theta_r = \lambda/d \qquad (5)$$

In this embodiment, the angle $\theta_r$ is about 19°.

The diffraction lights 5a and 5b incident on the beam transmission means 11 propagate through the interior of the beams 11, and are reflected at the reflection surfaces 6a and 6b as the side surfaces. The reflected lights emit from an exit surface 11b. The diffraction lights 5a and 5b emitting from the beam transmission means 11 are incident on the moving object 7 from different angles at the same incident angle $\theta'_1$ ($\theta'_1 = 29°$) as the diffraction angle $\theta_1$ so as to cross each other on the surface of the moving object 7. More specifically, in air, an angle to be formed by the two diffraction lights immediately after they emit from the diffraction grating coincides with a crossing angle defined by the two diffraction lights on the object in air.

With the above-mentioned arrangement of this embodiment, the $\pm$nth-order diffraction angle (of the diffraction lights) from the diffraction grating 10 changes according to a change in wavelength $\lambda$. An angle $\theta$ defined between the diffraction lights 5a and 5b and a direction perpendicular to a velocity measurement direction in a plane including the velocity measurement direction (direction 7a) and the optical paths of the diffraction lights 5a and 5b, that is, in this embodiment, the incident angle $\theta$ to the moving object, changes accordingly. Thus, the components such as the diffraction grating, the beam transmission means, and the like are arranged so as to obtain a substantially constant ratio $\sin(\theta)/\lambda$ at this time. In other words, these components are arranged so that both an angle to be formed by the two diffraction lights in air immediately after they emit from the diffraction grating and a crossing angle of the two diffraction lights on the moving object can become constant independently of the wavelength.

The focusing lens 8 focuses scattered lights having frequencies Doppler-shifted by $+\Delta f$ and $-\Delta f$ given by equation (1) and proportional to the moving velocity V of the moving object 7 on the detection surface 9a of the photosensor 9. The two scattered lights Doppler-shifted by $+\Delta f$ and $-\Delta f$ interfere with each other on the detection surface 9a. The photosensor 9 detects a light amount on the basis of the brightness pattern of the interference fringes at that time. More specifically, the photosensor 9 detects a Doppler signal representing a Doppler frequency F proportional to the moving velocity V, and given by the following equation obtained by substituting n=1 in equation (4) independently of the oscillation frequency λ of the laser 1:

$$F = 2V/d \tag{6}$$

The arithmetic means 14 calculates the moving velocity V using the output signal from the photosensor 9 in accordance with equation (6).

In this embodiment, as described above, since the diffraction grating 10 and the beam transmission means 11 for causing two diffraction lights of the predetermined orders from the diffraction grating 10 to be incident on the moving object 7 are integrally arranged, the two diffraction lights 5a, 5b can be incident on the moving object at a predetermined angle (equal to the diffraction angle $\theta_1$) in a state free from aging, and assuring high stability.

More specifically, in the Doppler velocimeter of this embodiment, a light beam having a wavelength λ is incident on the diffraction grating, diffraction lights of the predetermined orders diffracted by the diffraction grating are incident on the moving object at the incident angle θ, and velocity information of the moving object is detected on the basis of a frequency shift of scattered lights from the moving object, wherein the incident angle θ changes in accordance with the wavelength λ of the diffraction lights, the diffraction lights are incident on the moving object via the beam transmission means so as to make $\sin(\theta)/\lambda$ almost constant, and the diffraction grating and the beam transmission means are integrally arranged, thus providing a velocimeter having a more stable structure.

In other words, a light beam from the light source is incident on the diffraction grating. Two, i.e., +nth- and −nth-order (n=1, 2, 3, ...) diffraction lights from the diffraction grating are radiated at the same angle as the crossing angle of the two lights on the surface of the moving object from different directions via the beam transmission means having the two parallel reflection surfaces so that the two diffraction lights cross each other near the surface of the moving object. Two Doppler-shifted scattered lights from the surface of the moving object are detected by the detection means, and the moving velocity of the moving object is detected by utilizing a signal obtained by the detection means. In this case, since the diffraction grating and the beam transmission means are integrally arranged, the above-mentioned stable structure can be realized.

The beam transmission means comprises a glass block, and the diffraction grating is fixed to a portion of the glass block. The diffraction lights of the predetermined orders from the diffraction grating are caused to pass through the glass block, and are reflected at the reflection surfaces of the side surfaces. Thereafter, the diffraction lights emit from the glass block, and are incident on the moving object.

The effect of the above-mentioned structure will be described in detail below using comparative examples.

Figure 4:
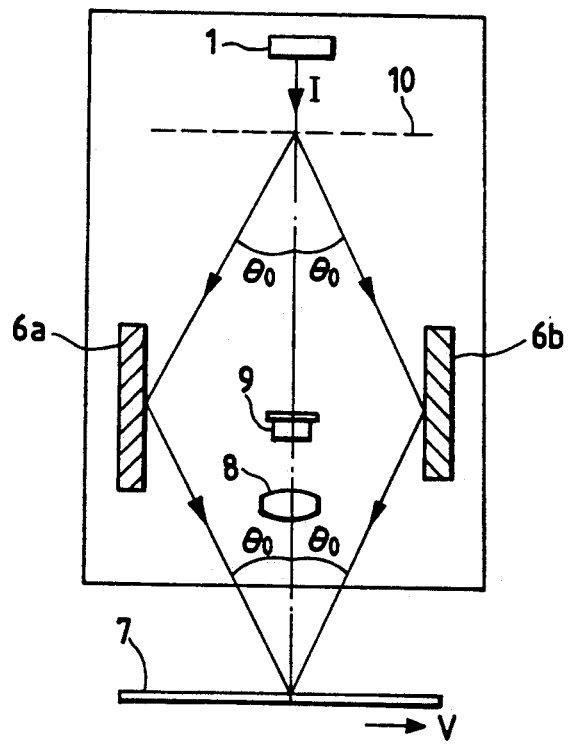
FIG. 4 is a diagram for explaining a Doppler velocimeter using the diffraction grating.

The reflection mirrors 6a and 6b must be perpendicular to the diffraction grating 10, and must be parallel to each other so as to establish equation (4) and to detect the moving velocity of the moving object independently of the wavelength of a laser beam I in the Doppler velocimeter shown in FIG. 4.

A change in Doppler frequency F when one reflection mirror 6a is inclined due to an assembling error or a change in environment will be described below with reference to FIG. 6.

Figure 6:
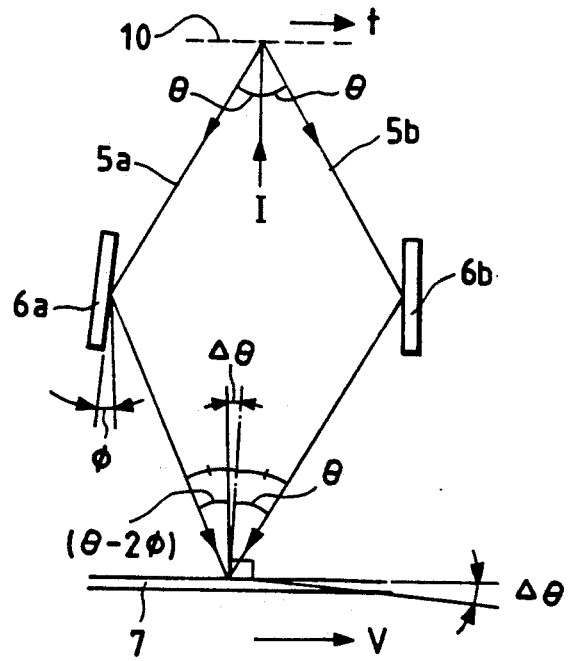
FIG. 6 is a schematic diagram of the principal part when a reflection mirror 6a shown in FIG. 5 is inclined.

In FIG. 6, assume that the reflection mirror 6b is perpendicular to the grating arranging direction t of the diffraction grating, and the reflection mirror 6a is inclined at an angle φ with respect to the reflection mirror 6b. The lights 5a and 5b are assumed to be ±1st-order diffraction lights.

In this case, a laser beam I propagates along optical paths shown in FIG. 6. If an angle defined between the perpendicular of the moving object 7 and a bisector of the lights 5a and 5b to the moving object 7 when the reflection mirrors 6a and 6b are parallel to each other, is represented by Δθ, the Doppler frequency F is given by:

$$F = 2V \cdot \cos\Delta\theta \cdot \sin(\theta - \phi)/\lambda \tag{7}$$

Since $\Delta\theta = \phi$ and $d\sin\theta = \lambda$, we have:

$$F = \frac{2V \cdot \cos\phi \cdot \sin(\theta - \phi)}{d\sin\theta} \tag{8}$$

That is, when the reflection mirror 6a is inclined, a frequency variation of the laser beam influences the Doppler frequency.

FIG. 7 shows ratios of frequency variation in correspondence with some inclination angles φ of the reflection mirror 6a when the wavelength of the laser beam is changed with respect to the Doppler frequency when the reference wavelength λ=0.78 μm. As can be seen from FIG. 7, as the inclination angle φ of the reflection mirror 6a is increased, the ratio of frequency variation caused by the wavelength variation is increased.

An inclination error of the reflection mirror similarly occurs when a member for holding the reflection mirror expands or contracts due to a change in temperature.

In this embodiment, since the diffraction grating and the reflection surfaces are arranged integrally with the glass block, a variation in relative positional relationship due to aging or an environmental change does not easily occur.

More specifically, according to this embodiment, as described above, since the diffraction grating and the beam transmission means having the two reflection surfaces for causing diffraction lights of the predetermined orders from the diffraction grating to be incident on the surface of the moving object are integrally arranged, a Doppler velocimeter which has a stable structure, has high reliability against an environmental change, requires neither adhesion for holding the reflection mirrors nor a pressing member such as a spring, and can detect the moving velocity of the moving object with high precision while simplifying the overall structure of the apparatus can be realized.

In this embodiment, the beam transmission means 11 may comprise a hollow prism or polygonal-prism-like case having parallel reflection surfaces 6a and 6b, and the diffraction grating 10 may be integrally arranged on the upper surface of the means 11. As the diffraction grating, a reflection type diffraction grating may be similarly adopted in addition to the transmission type diffraction grating.

The incident angle of the laser beam 3 on the diffraction grating 10 is not limited to 90°. For example, the laser beam may be incident on the diffraction grating at a predetermined angle. In this case, two diffraction lights of ±nth-order diffraction lights produced by the diffraction grating 10 are incident on the moving object while maintaining the same crossing angle as the crossing angle of the two diffraction lights of the ±nth-order diffraction lights.

If a light beam emitted from an identical light source is used, and if at least one of two diffraction lights to be incident on the moving object is an nth-order diffraction light, the other diffraction light can have any order other than the nth order such as the 0th order, (n+1)th order, (n+2)th order, and the like.

FIGS. 8A and 8B show the second embodiment of the present invention. FIG. 8A is a plan view of optical paths of two light beams, and FIG. 8B is a side view of a light-receiving optical path. The same reference numerals in FIG. 8 denote the same parts as in FIG. 5. In this embodiment, a glass block 11 comprises a rectangular glass member having a refractive index = 1.5, and its surfaces 11a and 11b are coated with reflection films.

A laser diode 1 emits a laser beam having a wavelength λ of about 0.67 μm, and the laser beam is converted into a collimated beam 3 having a spot size of 2 mm by a collimator lens 2. A transmission type diffraction grating 10 has a grating pitch d = 3.2 μm, and is set to efficiently output ±1st-order diffraction lights 5a and 5b. The diffraction grating 10 is fixed to the glass member 11.

The diffraction lights 5a and 5b are transmitted through the interior of the glass member 11, and a diffraction angle θ of the diffraction lights 5a and 5b satisfies the above-mentioned equation (5), and is about 8°:

$$1.5 \times \sin\theta_r = \lambda/d$$

Furthermore, the lights 5a and 5b are reflected by the surfaces 11a and 11b of the glass member 11, and are then totally reflected by surfaces 11c by internal reflection. The reflected lights 5a and 5b are then transmitted through a surface 11d in turn, and are incident on an object 7 to be measured at an incident angle θ which is given by equation (9), and is about 12°:

$$\sin\theta = \lambda/d \tag{9}$$

Scattered lights including a Doppler signal from the object 7 to be measured propagate through a focusing lens 8, turn their optical paths at a reflection prism 12, and are then introduced into a photosensor 9.

Figure 1:
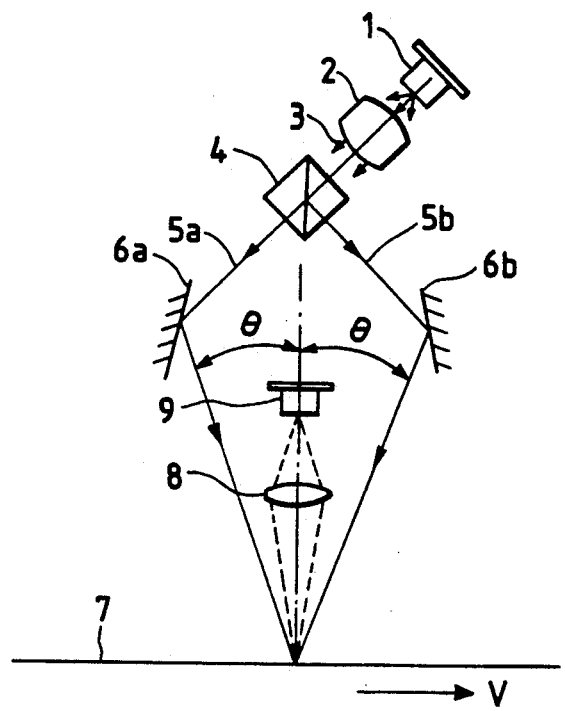
FIG. 1 is a schematic diagram of a conventional Doppler velocimeter.
Figure 2:
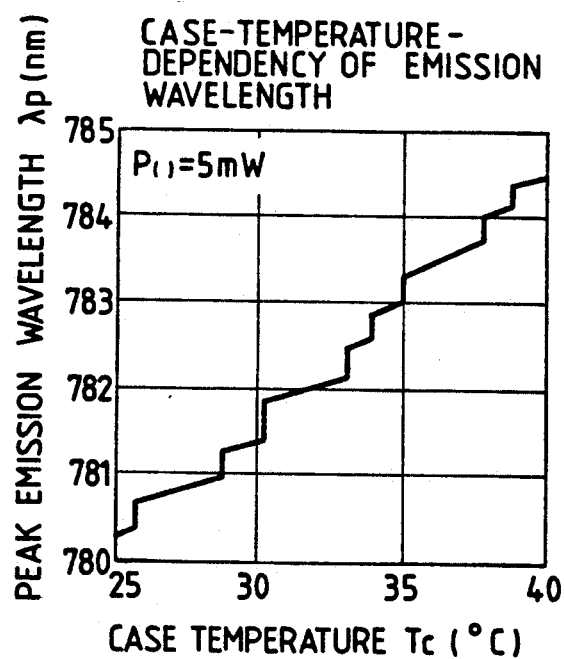
FIG. 2 is a graph for explaining temperature dependency of an oscillation wavelength of a laser diode.
Figure 3:
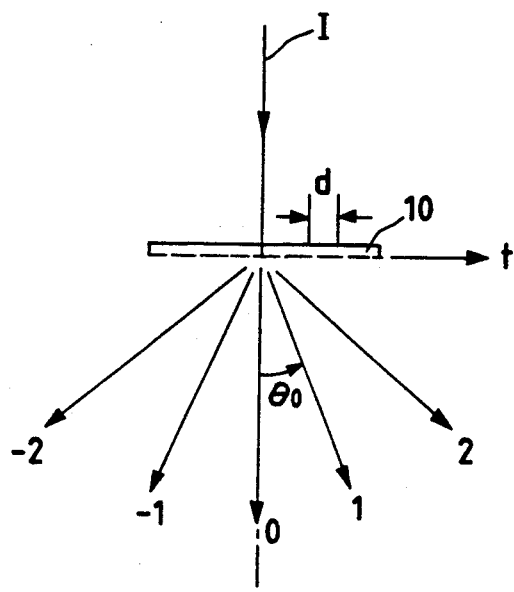
FIG. 3 is a diagram for explaining a diffraction grating.

When the wavelength λ of the laser diode 1 is changed, as shown in, e.g., FIG. 3, the incident angle θ changes on the basis of equation (9). In this case, from equation (4), a Doppler signal F is given by:

$$F = 2V/d \tag{10}$$

Thus, a stable signal can be detected.

With the structure according to the second embodiment of the present invention, the parallel side surfaces of the glass member 11 can be easily formed by a control in the manufacturing process. Thus, the structure of this embodiment is very stable against aging, and structural stability is very high.

In this embodiment, since the light beams are reflected a plurality of times within the glass block 11 to be radiated on an object, a relatively long optical path can be set in the glass block which is not easily influenced by an environmental change without increasing the size of the glass block. A distance (working distance) from the glass block 11 to a measurement point, i.e., a crossing point of the two light beams, must be increased to avoid a contact between an object to be measured and the velocimeter when they are unnecessarily close to each other. In order to increase the working distance, the crossing angle of the two light components must be decreased. In order to decrease the crossing angle of the two light beams in a structure wherein two diffraction lights from the diffraction grating are reflected by two parallel reflection surfaces to cross each other on the object, the diffraction angle of the diffraction grating is decreased. In this case, however, an optical path length between the diffraction grating and the reflection surface must be prolonged. When a glass block is used, it must be designed to have a shape prolonged by a desired increase in optical path length, thus disturbing a compact structure. In this embodiment, since the optical path between the diffraction grating and the reflection surface is turned within the glass block 11, the optical path length can be increased without increasing the length of the glass block in the right-and-left direction of FIG. 8A. Therefore, the working distance can be increased without increasing the size of the apparatus.

Figure 9A:
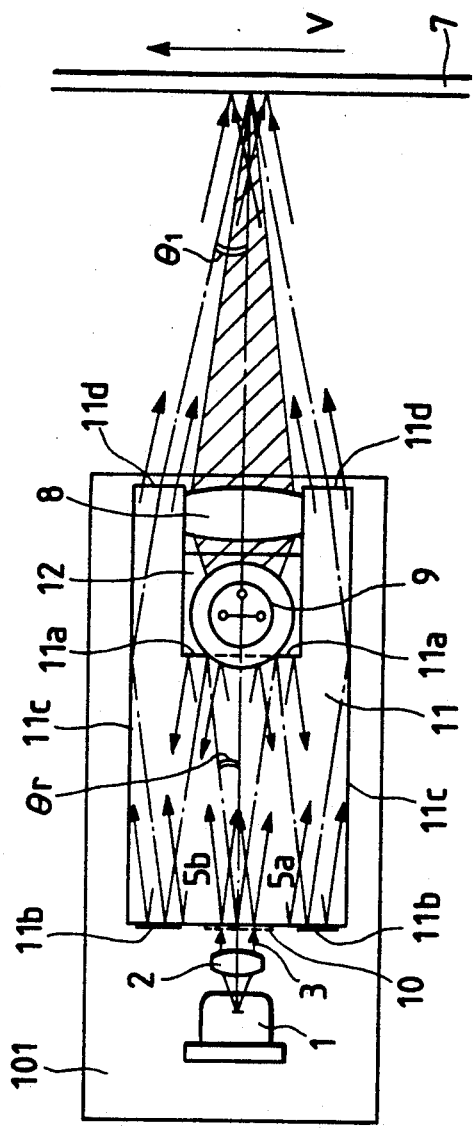
FIGS. 9A and 9B are respectively a plan view and a side view of the third embodiment of the present invention.
Figure 9B:
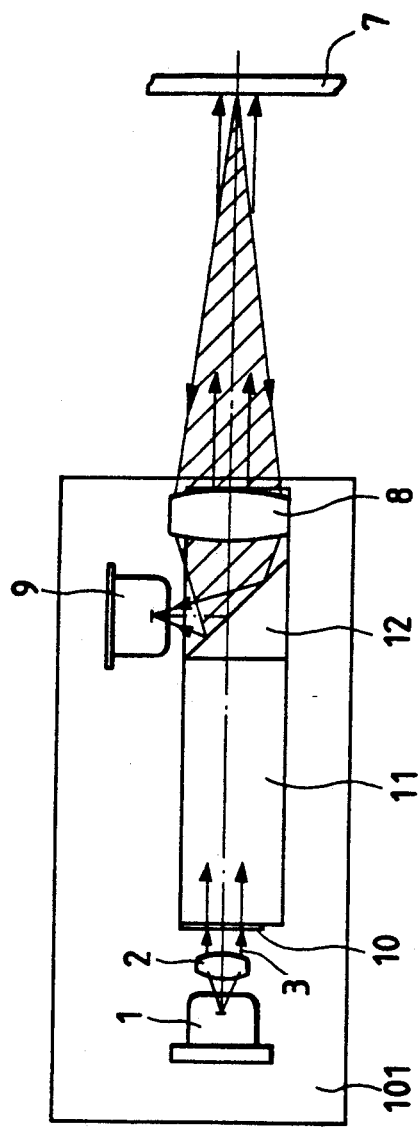

FIGS. 9A and 9B show the third embodiment of the present invention. FIG. 9A is a plan view of optical paths of two light beams, and FIG. 9B is a side view of a light-receiving optical path. This embodiment is substantially the same as the embodiment in FIGS. 8A and 8B, except that the shape of the glass member 11 in FIGS. 8A and 8B is changed to a concave shape, and a focusing lens 8 and a reflection prism 12 are arranged in the concave portion. In this case, since the glass member 11 has a concave shape, the focusing lens 8 and the reflection prism 12 can be arranged in this open space, and a space required for an optical path can be reduced. Thus, this structure is further effective for a compact apparatus.

In this specification, the member 11 has been described as a "glass member", but may be formed of, e.g., plastic.

In the second and third embodiments, the beam transmission means 11 may comprise a hollow prism or polygonal-prism-like case having parallel reflection surfaces 6a and 6b, and the diffraction grating 10 may be integrally arranged on the upper surface of the means 11. As the diffraction grating, a reflection type diffraction grating may be similarly adopted in addition to the transmission type diffraction grating.

The incident angle of the laser beam 3 on the diffraction grating 10 is not limited to 90°. For example, the laser beam may be incident on the diffraction grating at a predetermined angle. In this case, two diffraction lights of ±nth-order diffraction lights produced by the diffraction grating 10 are incident on the moving object while maintaining the same crossing angle as the crossing angle of the two diffraction lights of the ±nth-order diffraction lights.

If a light beam emitted from an identical light source is used, and if at least one of two diffraction light components to be incident on the moving object is an nth-order diffraction light component, the other diffraction light component can have any order other than the nth order such as the 0th order, (n+1)th order, (n+2)th order, and the like.

What is claimed is:

1. An apparatus for detecting information associated with a displacement of an object, comprising:
   illumination means for generating light having a wavelength λ;
   optical means, having a waveguide block, for causing the light from said illumination means to be incident into said waveguide block, and guiding the light through an interior of said waveguide block and onto the object, said waveguide block having a diffraction grating for diffracting the light from said illumination means and an optical element for causing the diffraction light from said diffraction grating to be incident on the object at an incident angle θ thereto, and said diffraction grating and said optical element being arranged so that sin(θ)/λ is substantially constant independently of a change in wavelength λ of the light from said illumination means; and
   light detection means for detecting the light from the object on which the light from said optical means is incident, the information associated with the displacement of the object being detected through detection of said light detection means.

2. An apparatus for detecting information associated with a displacement of an object, comprising:
   illumination means for generating light having a wavelength λ;
   optical means, having a waveguide section, for causing the light from said illumination means to be incident into said waveguide section and guiding the light onto the object, said waveguide section having a diffraction grating for diffracting the light from said illumination means and an optical element for causing the diffraction light from said diffraction grating to be incident on the object at an incident angle θ thereto, and said diffraction grating and said optical element being arranged so that sin(θ)/λ is substantially constant independently of a change in wavelength λ of the light from said illumination means; and
   light detection means for detecting the light from the object on which the light from said optical means is incident, the information associated with the displacement of the object being detected through detection of said light detection means, wherein said waveguide section comprises a block formed of glass.

3. An apparatus according to claim 2, wherein said diffraction grating is formed on a surface of said block.

4. An apparatus according to claim 2, wherein said optical element is a reflection surface formed on a surface of said block.

5. An apparatus according to claim 2, wherein said diffraction grating is formed on a surface of said block, said optical element has a reflection surface formed on a surface of said block, and the reflection surface reflects the diffraction light produced in said block from said diffraction grating to radiate the light from block onto the object.

6. An apparatus according to claim 5, wherein the reflection surface includes two reflection surfaces, arranged to reflect two diffraction lights from said diffraction grating to radiate the diffraction lights to a substantially identical position on the object.

7. An apparatus according to claim 6, wherein the two reflection surfaces are parallel to each other, and are arranged to be perpendicular to a grating arranging direction of said diffraction grating.

8. An apparatus according to claim 7, wherein the two reflection surfaces respectively reflect an +nth-order diffraction light and an −nth-order diffraction light produced from said diffraction grating as the two diffraction lights.

9. An apparatus according to claim 5, wherein the reflection surface includes a plurality of reflection surfaces, are arranged to reflect the two diffraction light so that the two diffraction lights from said diffraction grating are radiated on a substantially identical position on the object after the diffraction lights are reflected a plurality of times within said block.

10. An apparatus according to claim 2, wherein said block has a concave portion on a side facing the object, and said light detection means detects the light via the concave portion.

11. An apparatus according to claim 1, wherein said light detection means detects the light so that a velocity of the object is detected through detection by said light detection means.

12. An apparatus for detecting information associated with a displacement of an object along a predetermined direction, comprising:
    illumination means for generating a light having a wavelength λ;
    optical means, having a waveguide block, for causing the light from said illumination means to be incident into said waveguide block and guiding the light through an interior of said waveguide block and onto the object, said waveguide block having a diffraction grating for diffracting the light from said illumination means and an optical element for causing a diffraction light from said diffraction grating to be incident on the object, said optical element causing the diffraction light to be incident on the object so that an angle defined between a perpendicular direction to the predetermined direction and the diffraction light within a plane including the predetermined direction and an optical path of the diffraction light becomes an angle θ, and said diffraction grating and said optical element being arranged so that sin(θ)/λ is substantially constant independently of a change in wavelength λ of the light from said illumination means; and
    light detection means for detecting the light from the object on which the light from said optical means is incident, the information associated with the displacement of the object being detected through detection of said light detection means.

13. An apparatus for detecting information associated with a displacement of an object along a predetermined direction, comprising:
    illumination means for generating a light having a wavelength λ;
    optical means, having a waveguide section, for causing the light from said illumination means to be incident into said waveguide section and guiding the light onto the object, said waveguide section having a diffraction grating for diffracting the light from said illumination means and an optical element for causing the diffraction light from said diffraction grating to be incident on the object, said optical element causing the diffraction light to be incident on the object so that an angle defined between a perpendicular direction to the predetermined direction and the diffraction light within a plane including the predetermined direction and an optical path of the diffraction light becomes an angle $\theta$, and said diffraction grating and said optical element being arranged so that $\sin(\theta)/\lambda$ is substantially constant independently of a change in wavelength $\lambda$ of the light from said illumination means; and light detection means for detecting the light from the object on which the light from said optical means is incident, the information associated with the displacement of the object being detected through detection of said light detection means, wherein said waveguide section comprises a block formed of glass.

14. An apparatus according to claim 13, wherein said diffraction grating is formed on a surface of said block.

15. An apparatus according to claim 13, wherein said optical element is a reflection surface formed on a surface of said block.

16. An apparatus according to claim 13, wherein said diffraction grating is formed on a surface of said block, said optical element has a reflection surface formed on a surface of said block, and the reflection surface reflects the diffraction light produced in said block from said diffraction grating to radiate the light from the block onto the object.

17. A velocimeter for detecting velocity of an object, comprising:
a light source for generating a light having a wavelength $\lambda$;
a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at a predetermined incident angle thereto, and said diffraction grating and said optical element being arranged so that $\sin(\theta)/\lambda$ is substantially constant independently of a change in wavelength $\lambda$ of the light from said light source where $\theta$ is an incident angle of each diffraction light onto the object; and
a photosensor for detecting the light from the object on which the light from said light-transmission block is incident, the velocity of the object being detected through detection by said photosensor.

18. A velocimeter for detecting velocity of an object, comprising:
a light source for generating a light having a wavelength $\lambda$;
a light-transmission section for receiving the light from said light source and guiding the light onto the object, said light-transmission block having a diffraction grating for diffracting the light from said light source to produce two diffraction lights and an optical element for causing the two diffraction lights from said diffraction grating to be incident onto the object at a predetermined incident angle thereto, and said diffraction grating and said optical element being arranged so that $\sin(\theta)/\lambda$ is substantially constant independently of a change in wavelength $\lambda$ of the light from said light source where $\theta$ is an incident angle of each diffraction light onto the object; and
a photosensor for detecting the light from the object on which the light from said light-transmission block is incident, the velocity of the object being detected through detection by said photosensor, wherein said optical element is a reflection surface formed on a surface of said light-transmission block.

19. A velocimeter according to claim 18, wherein the reflection surface includes two reflection surfaces, arranged to reflect two diffraction lights from said diffraction grating to radiate the diffraction lights to a substantially identical position on the object.

20. A velocimeter according to claim 19, wherein the two reflection surfaces are parallel to each other, and are arranged to be perpendicular to a grating arranging direction of said diffraction grating.

21. A velocimeter according to claim 20, wherein the two reflection surfaces respectively reflect an $+$nth-order diffraction light and an $-$nth-order diffraction light produced from said diffraction grating as the two diffraction lights.

22. A velocimeter according to claim 18, wherein the reflection surface includes a plurality of reflection surfaces, are arranged to reflect the two diffraction lights so that the two diffraction lights from said diffraction grating are radiated on a substantially identical position on the object after the lights are reflected a plurality of times within said light-transmission block.

23. A velocimeter according to claim 17, wherein said light-transmission block has a concave portion on a side facing the object, and said photosensor detects the light via the concave portion.

24. A velocimeter for detecting velocity of an object, comprising:
a light source for generating a light having a wavelength $\lambda$;
a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at an incident angle thereto; and
a photosensor used for detecting a frequency signal of the light from the object on which the light from said light-transmission block is incident, the velocity of the object being detected through detection of the frequency signal by said photosensor,
said diffraction grating and said optical element being arranged to change the incident angle in a direction in which an error component of the frequency signal is prevented from being generated due to a change in wavelength $\lambda$ of the light from said light source.

25. A velocimeter for detecting velocity of an object, comprising:
a light source for generating a light having a wavelength $\lambda$;
a light-transmission block for receiving the light from said light source and guiding the light onto the object, said light-transmission block having a diffraction grating for diffracting the light from said light source to produce two diffraction lights and an optical element for causing the two diffraction lights from said diffraction grating to be incident onto the object at an incident angle thereto; and a photosensor used for detecting a frequency signal of the light from the object on which the light from said light-transmission block is incident, the velocity of the object being detected through detection of the frequency signal by said photosensor, said diffraction grating and said optical element being arranged to change the incident angle in a direction in which an error component of the frequency signal is prevented from being generated due to a change in wavelength λ of the light from said light source, wherein said optical element is a reflection surface formed on a surface of said light-transmission block.

26. A velocimeter according to claim 25, wherein the reflection surface includes two reflection surfaces arranged to reflect two diffraction lights from said diffraction grating to radiate the diffraction lights to a substantially identical position on the object.

27. A velocimeter according to claim 26, wherein the two reflection surfaces are parallel to each other and are arranged to be perpendicular to a grating arranging direction of said diffraction grating.

28. A velocimeter according to claim 27, wherein the two reflection surfaces respectively reflect an +nth-order diffraction lights and an −nth-order diffraction lights produced from said diffraction grating as the two diffraction lights.

29. A velocimeter according to claim 25, wherein the reflection surface includes a plurality of reflection surfaces arranged to reflect the two diffraction lights so that the two diffraction lights from said diffraction grating are radiated on a substantially identical position on the object after the diffraction lights are reflected a plurality of times within said light-transmission block.

30. A velocimeter according to claim 24, wherein said light-transmission block has a concave portion on a side facing the object, and said photosensor detects the light via the concave portion.

31. A velocimeter for detecting velocity of an object, comprising:

a light source for generating a light having a wavelength λ;

a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at a predetermined incident angle thereto, and said diffraction grating and said optical element being arranged so that a crossing angle of the two diffraction lights on the object substantially coincides with an angle which is formed in air by the two diffraction lights immediately after the diffraction lights emit from said diffraction grating independently of a change in wavelength λ of the light from said light source; and a photosensor for detecting the light from the object on which the light from said light-transmission block is incident, a velocity of the object being detected through detection by said photosensor.

32. A velocimeter for detecting velocity of an object, comprising:

a light source for generating a light having a wavelength λ;

a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at a predetermined incident angle thereto, and said diffraction grating and said optical element being arranged so that a crossing angle of the two diffraction lights on the object substantially coincides with an angle which is formed in air by the two diffraction lights immediately after the diffraction lights emit from said diffraction grating independently of a change in wavelength λ of the light from said light source; and a photosensor for detecting the light from the object on which the light from said light-transmission block is incident, a velocity of the object being detected through detection by said photosensor, wherein said optical element is a reflection surface formed on a surface of said light-transmission block.

33. A velocimeter according to claim 32, wherein the reflection surface includes two reflection surfaces, arranged to reflect two diffraction lights from said diffraction grating to radiate the diffraction lights to a substantially identical position on the object.

34. A velocimeter according to claim 33, wherein the two reflection surfaces are parallel to each other, and are arranged to be perpendicular to a grating arranging direction of said diffraction grating.

35. A velocimeter according to claim 34, wherein the two reflection surfaces respectively reflect an +nth-order diffraction light and an −nth-order diffraction light produced from said diffraction grating as the two diffraction lights.

36. A velocimeter according to claim 32, wherein the reflection surface includes a plurality of reflection surfaces arranged to reflect the two diffraction lights so that the two diffraction lights from said diffraction grating are radiated on a substantially identical position on the object after the diffraction lights are reflected a plurality of times within said light-transmission block.

37. A velocimeter according to claim 31, wherein said light-transmission block has a concave portion on a side facing the object, and said photosensor detects the light via the concave portion.

38. A velocimeter for detecting velocity of an object, comprising:

a light source for generating a light having a wavelength λ;

a light-transmission block for receiving the light from said light source and guiding the light through an interior thereof and onto the object, said light-transmission block having a diffraction grating for diffracting the light from said light source to produce two diffraction lights and a plurality of reflection surfaces for causing the two diffraction lights from said diffraction grating to be incident onto the object at a predetermined incident angle thereto, said plurality of reflection surfaces being arranged to reflect the two diffraction lights so that the two diffraction lights from said diffraction grating are radiated on the object after the diffraction lights are reflected a plurality of times within said light-transmission block; and a photosensor for detecting the light from the object on which the light from said light-transmission block is incident, information associated with displacement of the object being detected through detection by said photosensor, said diffraction grating and said plurality of reflection surfaces being arranged to change the incident angle in a direction in which the error component of the frequency signal is prevented from being generated due to a change in wavelength $\lambda$ of the light from said light source.

39. An apparatus for detecting information associated with displacement of an object, comprising:

a light source for generating a light having a wavelength $\lambda$;

a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at a predetermined incident angle thereto; and a photosensor used for detecting a frequency signal of the light from the object on which the light from said light-transmission block is incident, the information associated with displacement of the object being detected through detection of the frequency signal by said photosensor, said diffraction grating and said optical element being arranged to change the incident angle in a direction in which an error component of the frequency signal is prevented from being generated due to a change in wavelength $\lambda$ of the light from said light source.

40. An apparatus for detecting information associated with displacement of an object, comprising:

a light source for generating a light having a wavelength $\lambda$;

a light-transmission block for receiving the light from said light source and guiding the light through an interior thereof and onto the object, said light-transmission block having a diffraction grating for diffracting the light from said light source to produce two diffraction lights and an optical element for causing the two diffraction lights from said diffraction grating to be incident onto the object at a predetermined incident angle thereto; and a photosensor used for detecting a frequency signal of the light from the object on which the light from said light-transmission block is incident, the information associated with displacement of the object being detected through detection of the frequency signal by said photosensor, said diffraction grating and said optical element being arranged to change the incident angle in a direction in which an error component of the frequency signal is prevented from being generated due to a change in wavelength $\lambda$ of the light from said light source, wherein said optical element is a reflection surface formed on a surface of said light-transmission block.

41. An apparatus according to claim 40, wherein the reflection surface includes two reflection surfaces, arranged to reflect two diffraction lights from said diffraction grating to radiate the diffraction lights to a substantially identical position on the object.

42. An apparatus according to claim 41, wherein the two reflection surfaces are parallel to each other, and are arranged to be perpendicular to a grating arranging direction of said diffraction grating.

43. An apparatus according to claim 42, wherein the two reflection surfaces respectively reflect an +nth-order diffraction light and an −nth-order diffraction light produced from said diffraction grating as the two diffraction lights.

44. An apparatus according to claim 2, wherein said light detection means detects the light so that a velocity of the object is detected through detection by said light detection means.

45. A velocimeter according to claim 18, wherein said light-transmission block has a concave portion on a side facing the object, and said photosensor detects the light via the concave portion.

46. A velocimeter according to claim 25, wherein said light-transmission block has a concave portion on a side facing the object, and said photosensor detects the light via the concave portion.

47. A velocimeter according to claim 32, wherein said light-transmission block has a concave portion on a side facing the object, and said photosensor detects the light via the concave portion.

* * * * *

UNITED STATES PATENT AND TRADEMARK OFFICE
CERTIFICATE OF CORRECTION

PATENT NO. : 5,272,512
DATED : December 21, 1993
INVENTOR(S) : Kadowaki et al.

It is certified that error appears in the above-indentified patent and that said Letters Patent is hereby corrected as shown below:

COLUMN 9:

Line 62, "from block" should read --from said block--.

COLUMN 10:

Line 12, "faces, are" should read --faces-- and "light" should read --lights--.

COLUMN 15:

Line 10, "the" should read --an--.

Signed and Sealed this

Thirtieth Day of August, 1994

Attest:

Attesting Officer

BRUCE LEHMAN

Commissioner of Patents and Trademarks